United States Patent [19]

Kuiper

[11] 4,228,088

[45] Oct. 14, 1980

[54] SELECTIVE HYDROGENATION

[75] Inventor: Jan Kuiper, Vlaardingen, Netherlands

[73] Assignee: Lever Brothers Company, New York, N.Y.

[21] Appl. No.: 27,621

[22] Filed: Apr. 6, 1979

Related U.S. Application Data

[63] Continuation-in-part of Ser. No. 970,836, Dec. 18, 1978, abandoned.

[30] Foreign Application Priority Data

Dec. 19, 1977 [GB] United Kingdom ............... 52750/77

[51] Int. Cl.$^3$ .............................................. C11C 3/12
[52] U.S. Cl. ...................................... 260/409; 252/438
[58] Field of Search ......................... 260/409; 252/438

[56] References Cited

U.S. PATENT DOCUMENTS

| | | | |
|---|---|---|---|
| 1,893,155 | 1/1933 | Bennett | 260/409 |
| 3,117,939 | 1/1964 | Royce | 260/409 |
| 3,197,418 | 7/1965 | Maebashi | 260/409 |
| 3,896,051 | 7/1975 | Mabuchi et al. | 252/412 |
| 3,919,271 | 4/1975 | Parshall | 260/409 |
| 3,980,720 | 9/1976 | Mabuchi et al. | 252/412 |
| 4,038,295 | 7/1977 | Stern et al. | 260/409 |
| 4,117,242 | 9/1978 | Fozzard | 260/409 |

FOREIGN PATENT DOCUMENTS

| | | | |
|---|---|---|---|
| 871804 | 6/1961 | United Kingdom | 260/409 |
| 886477 | 1/1962 | United Kingdom | 260/409 |
| 948861 | 2/1964 | United Kingdom | 260/409 |
| 1428287 | 3/1976 | United Kingdom | 260/409 |

*Primary Examiner*—John F. Niebling
*Attorney, Agent, or Firm*—James J. Farrell; Melvin H. Kurtz

[57] ABSTRACT

The selectivity of the hydrogenation of compounds containing more than one double carbon-carbon bond in the presence of a metallic catalyst of group VIII of the periodic system is improved and trans isomer formation is reduced by treating the catalyst with a basic compound before addition of the catalyst to the substrate or in situ.

The basic compound is a quaternary ammonium hydroxide, an alkali or alkaline earth hydroxide or ammonium hydroxide, a salt with a weak acid of such a hydroxide or an alcoholate of the cations of these hydroxides.

12 Claims, No Drawings

SELECTIVE HYDROGENATION

This application is a continuation-in-part of Ser. No. 970,836 filed Dec. 18, 1978, now abandoned.

The invention relates to a process for the selective hydrogenation of poly-unsaturated compounds, in particular poly-unsaturated fatty acid esters, especially their triglycerides.

As is generally known, oils and fats consist substantially of a mixture of triglycerides of fatty acids. The fatty acids usually contain about 16 to about 22 carbon atoms and can be saturated, such as stearic acid; mono-unsaturated, such as oleic acid; di-unsaturated, such as linoleic acid or tri-unsaturated, such as linolenic acid, or even show a higher unsaturation.

In the art of oil and fat technology it is customary to hydrogenate oils to remove part of the unsaturation and thereby give the hydrogenated oil desired properties, like higher melting point and/or increased stability.

During the hydrogenation a number of reactions occur, both consecutively and concurrently. For instance, for the hydrogenation of linolenic acid the hydrogenation can be represented by the following simplified scheme:

linolenic acid $\xrightarrow{K_1}$ linoleic acid $\xrightarrow{K_2}$ oleic acid $\xrightarrow{K_3}$ stearic acid, in which $K_1$, $K_2$, etc. designate the rate constants of the reactions involved. Moreover, side reactions occur, such as displacement and isomerisation of double bonds. Isomerisation leads to conversion of cis double bonds to trans double bonds, the corresponding oils containing the trans acids usually have a higher melting point. Oils and fats containing a high amount of stearic acid have too high a melting point to be organoleptically acceptable for most applications. Therefore, in the past it was customary to direct the hydrogenation in such a way that as little stearic acid as possible was formed and a high amount of trans oleic acid was obtained to give the oil the desired melting point. Nowadays, the cis-trans isomerisation is considered less desirable because there is a shift to liquid but stable oils which are applied as such or as ingredients for soft margarines which are stored in refrigerators.

The selectivities in the hydrogenation reactions are usually defined as follows:

$$S_I = \frac{K_2}{K_3}$$
$$S_{II} = \frac{K_1}{K_2}$$

When $S_I$ of the reaction is high, low amounts of saturated acids are produced. When $S_{II}$ of the reaction is high it is possible to hydrogenate linolenic acid, while maintaining a high percentage of the essential fatty acid: linoleic acid.

The isomerisation selectivity, $S_i$, is defined as the amount of trans isomers formed in relation to the hydrogenation degree. As has been said, nowadays one wishes to direct the hydrogenation in such a way that $S_i$ has as low a value as possible.

However, in normal practice of hydrogenation, which is usually carried out with the aid of a nickel catalyst supported on a carrier at high temperatures and elevated pressures, substantial isomerisation of double bonds cannot be avoided.

Some catalysts have been proposed as being more selective, for instance copper catalysts. However, such catalysts, though being more selective, give about the same degree of isomerisation as nickel does.

Palladium catalysts have been proposed for the selective hydrogenation of soyabean oil (Belgian Pat. No. 851 202). Although these catalysts are selective, they do not give a higher content of linoleic acid than 40% at a linolenic acid content of 2%, starting from a soyabean oil containing 7–9% linolenic and 50–55% linoleic acid.

In our co-pending British Patent Application No. 54 485/76, it has been proposed to hydrogenate fatty oils with catalysts having an externally applied electric potential which differs from the naturally occurring equilibrium potential.

It has now been found that the course of the reactions occurring during the hydrogenation with the aid of a metallic catalyst can be influenced by treating the catalyst with a particular basic additive.

According to the invention an organic compound containing more than one double bond between carbon atoms can be selectively hydrogenated with hydrogen in the presence of a catalytically active metal of group VIII of the periodic system of the elements, which may be promoted by a metal from another group of said system, the catalyst being treated with a basic compound with the formula AX, in which A is either $R_1R_2R_3R_4N^+$; $R_1$, $R_2$, $R_3$ and $R_4$ each being an alkyl, cycloalkyl, aryl or aralkyl group with 1 to 20 carbon atoms which may be substituted, or an element of group I or II of the periodic system, or ammonium and X is hydroxyl, an anion of a weak acid or RO—, in which R is an alkyl group.

Preferably R contains 1 to 4 carbon atoms.

It has been proposed to perform fatty oil hydrogenation in the presence of additives, such as alcohols and polyalcohols (cf. British Pat. No. 1 080 891) or amines (Japanese Pat. No. 4021 (1962)), but in the process according to the present invention higher selectivities are achieved.

It is known that in the catalytic hydrogenation or reduction of complicated organic molecules the addition of bases can direct the reaction to the formation of a high proportion or cis or trans isomers (R. L. Augustine, Catalytic Hydrogenation; Marcel Dekker Inc., New York (1965) p. 46–49 and F. Zymalkowski, Katalytische Hydrierungen, Ferdinand Enke Verlag, Stuttgart (1965) p. 7 and 67–69).

It has now been found that in the process according to the invention the hydrogenation is directed in such a way that polyunsaturated fatty acid groups are hydrogenated selectively almost without the formation of saturated fatty acid groups, whereas relatively few trans isomers are formed. Moreover, the invention is characterised by the fact that linolenic acid groups (or trienoic acid groups), if present, are hydrogenated in preference to dienoic acid (linoleic acid) groups, resulting in the formation of products with a low linolenic acid content and a high linoleic acid content.

The catalytically active elements of group VIII of the periodic system, which can be used in the process of the invention are Fe, Co, Ni, Ru, Rh, Pd, Os, Ir and Pt; Pd, Pt and Ni being preferred. Also alloys of these metals can be used. Such catalytically active metals may contain other metals, which have a promoting action on the catalyst, with regard to activity and/or selectivity, such as, Cu, Ag, Au, Zn, Cd, Hg, Ti, Zr, Hf, V, Nb, Ta, Cr, Mo, W or Mn.

Such a catalyst can take the form of an extracted alloy, such as Raney nickel. The catalyst can be used in the form of a porous metal supported on a sheet, which is immersed in the system, or preferably be in the form of small particles suspended in the system, like palladium powder or metal sols prepared by reduction of a soluble compound of the metal with an organometallic reducing agent. The metallic component can be supported on a carrier. For instance carbon, silica, alumina, Kieselguhr or an ion-exchange resin may be used as a catalyst carrier.

The amount of catalytically active metal used in the hydrogenation is not critical and may range from 1 mg/kg to 10 g/kg, calculated as metal on the compound to be hydrogenated, for said amount depends on the form of the catalyst, supported on a carrier or not, on the specific surface of the catalyst, on the catalytic activity of the particular metal used, on the amount of basic additive used, and other factors.

The catalyst can be treated with the basic additive before the hydrogenation and this mixture, either as such or after the excess of basic additives has been removed by decanting or washing, can be added to the substance to be hydrogenated. As liquid in the catalyst pre-treatment process water or an organic liquid, such as acetone, tetrahydrofurane, dimethylformamide, or alcohols and polyalcohols, if alcoholysis is desired, or a mixture thereof, can be used.

The basic compound can also be added directly to the compound to be hydrogenated, preferably dissolved in one of the above-mentioned solvents. The treatment of the catalyst with the basic additive takes place in situ when this procedure is followed.

The amount of base used is not critical, and is usually about 0,1 mol to about 100 mol per m$^3$ of the substrate to be hydrogenated. Activity, selectivity and trans isomer formation depend on the amount of the basic compound added. Increasing said amount results usually in lower activity, and in better selectivity and lower cis-trans isomerisation.

Activity, selectivity and trans isomer formation in the hydrogenation at a certain added amount of the basic compound depend on the catalyst load and catalyst type. When a triglyceride oil is to be hydrogenated the oil quality and the refining procedure of the crude oil influence the hydrogenation characteristics at the different amounts of the basic additive.

As basic compounds preferably strong organic or inorganic bases are used. Also salts of such bases with a weak organic or inorganic acid can be applied. Good results have been obtained with the hydroxides, carbonates, phosphates, formates, acetates and lactates of tetramethylammonium, tetraethylammonium, tetrabutylammonium, tetraheptylammonium, hexadecyltrimethylammonium, benzyltrimethylammonium, tricaprylmethylammonium, ethanoltrimethylammonium and bis-tetraalkylammonium. Equally good results have been obtained with lithium, sodium, potassium, rubidium, cesium, barium and ammonium hydroxide, as well as salts of these bases with the above-mentioned weak acids. Also, alcoholates of these alkali- and alkaline earth metals can be used.

In carrying out the process of the invention the substance to be hydrogenated can be dissolved or dispersed in an organic liquid, such as a ketone or a hydrocarbon. Alcohols give also good results, but alcoholysis or interesterification can take place and alcohols can be used when alcoholysis or interesterification is desired. The hydrogenation can also be carried out in the pure substance, whereas the base added is dissolved in water or an organic liquid.

The ratio of liquid to substrate is not critical and can range from an amount just necessary to dissolve the basic additive and to keep the catalyst suspended to about 20:1.

The process is not sensitive to the presence of water, although the amount should be restricted to a minimum in order that oil losses by saponification of the esters be reduced to a minimum. Some strong organic bases can be unstable and decompose in the process. It is clear that the invention will not work when the base is no longer present.

Especially the strong organic ammonium bases have advantages by yielding low trans isomer contents in the products.

In general the hydrogenation is performed in a suitable equipment, such as a stirred tank reactor, or continuously in a series of stirred tank reactors, but hydrogenation over a column of catalyst particles can also give good results. The hydrogenation can be performed by adding the basic additive and catalyst to the substrate under nitrogen or another inert gas and starting the hydrogenation by adding hydrogen, or the substrate can be brought into the reactor containing catalyst and basic additive or a pre-treated catalyst under a hydrogen atmosphere. The catalyst can first be treated with the basic additive and added to the hydrogenator, or the excess of basic additive can be removed by centrifugation or filtration and washing, followed by addition of the treated catalyst to the hydrogenation reactor containing the substrate to be hydrogenated.

The temperature at which the hydrogenation is carried out is not critical, but good results have been obtained at temperatures of 0° C. to 100° C., in particular at 10° C. to 60° C., with active catalysts. In general the temperature can lie in the range of −20° C. to 200° C. At the higher temperature strong organic bases may decompose; also higher trans isomer contents may result.

The reaction may be carried out at atmospheric pressure or at higher pressures; in general the pressure will lie between 100 and 2500 kPa. Of course pressures above atmospheric are needed if one wishes to operate at a temperature above the boiling point of the liquid when a liquid is used.

The process can be controlled by known means e.g. by discontinuing the hydrogenation when a previously calculated amount of hydrogen gas has been absorbed.

The process of the invention can be applied for the hydrogenation of compounds or groups containing more than one double bond, to increase the selectivity of the hydrogenation reaction. As examples can be mentioned the hydrogenation of soyabean oil, rapeseed oil, linseed oil, fish oils, tallow and similar animal fats, palm oil, esters of fatty acids, such as the methyl, ethyl and other alkyl esters, soaps, alcohols and other fatty acid derivatives of which hydrogenation is important, and to convert highly poly-unsaturated compounds, such as cyclododecatriene, into monoenoic or dienoic compounds without giving a high proportion of trans isomers or saturated compounds.

The products can be used as frying oil, table oil, margarine base or as a base for the preparation of stable products such as soaps, esters, etc.

The invention is further illustrated but not restricted by the following Examples. In some Examples the proportions do not add up to 100% because less relevant fatty acid components like $C_{14}$, $C_{17}$, $C_{20}$, $C_{22}$ fatty acids were not mentioned. The compositions of the substrates before and after hydrogenation are given in mol %. Other percentages are by weight. The abbreviation "TEAH" means tetraethylammonium hydroxide.

In the Tables the fatty acids are designated by the number of carbon atoms and the number of double bonds they contain, viz. C18:3 means linolenic acid, C18:2 linoleic acid, etc.

EXAMPLE I

The hydrogenation was performed under atmospheric pressure and at room temperature in an apparatus consisting of a vessel with a net content of 125 cm³ provided with a magnetic stirrer, four baffles, an inlet for hydrogen, an inlet for substrate and a sampling device.

The reactor was connected with a 500 cm³ calibrated burette filled with hydrogen (purified over BTS catalysts and $CaCl_2$) and paraffin oil. The reactor was loaded with 100 mg palladium powder as the catalyst and 90 cm³ acetone. The reactor was repeatedly evacuated and purged with argon. After that 1 cm³ of a 20% solution of tetraethylammonium hydroxide (TEAH) in water was added. The solution was stirred and the argon was replaced by hydrogen. After 15 minutes 29 gram degassed soyabean oil was added.

The course of the hydrogenation of the soyabean oil is represented in Table 1.

TABLE 1

| Hydrogenation time (min.) | H₂ consumption (cm³/10 g) | Fatty acid composition (%) | | | | | trans (%) |
|---|---|---|---|---|---|---|---|
| | | C16:0 | C18:0 | C18:1 | C18:2 | C18:3 | |
| starting oil | | 10,9 | 3,6 | 21,0 | 56,2 | 8,0 | <1 |
| 39 | 110 | 10,9 | 3,6 | 29,9 | 53,0 | 2,6 | 4 |
| 52 | 145 | 10,8 | 3,6 | 32,5 | 51,1 | 2,1 | 6 |
| 75 | 214 | 10,8 | 3,6 | 39,7 | 45,3 | 1,2 | 7 |

EXAMPLE II

Example I was repeated, using 1 cm³ of a 25% solution of hexadecyltrimethylammonium hydroxide in methanol as additive and 60 mg 3% Pd/C as catalyst.

Table 2 shows the results:

TABLE 2

| Hydrogenation time (%) | Trans (%) | Fatty acid composition (%) | | | | |
|---|---|---|---|---|---|---|
| | | C16:0 | C18:0 | C18:1 | C18:2 | C18:3 |
| starting oil | <1 | 10,9 | 3,6 | 21,0 | 56,2 | 8,0 |
| 66 | 6 | 11,0 | 3,7 | 30,0 | 53,0 | 2,0 |

In a comparative experiment in which the quaternary ammonium base was not added, the experimental results were:

Conditions:
60 mg 3% palladium-on-carbon
70 cm³ acetone
30,7 gram soyabean oil.
Hydrogenation time: 31 min.
Fatty acid composition (mol %):
C16:0 : 11,0
C18:0 : 4,4
C18:1 : 44,4
C18:2 : 38,1
C18:3 : 2,1
trans isomers : 15

EXAMPLE III

Example I was repeated, using some other additives and 60 mg 3% Pd/C as catalyst. The various additives used are listed in column 1 of Table 3.

TABLE 3

| Additive | Hydrogenation time (min) | trans (%) | Fatty acid composition (%) | | | | |
|---|---|---|---|---|---|---|---|
| | | | C16:0 | C18:0 | C18:1 | C18:2 | C18:3 |
| | starting oil | <1 | 10,3 | 4,5 | 24,4 | 53,1 | 7,7 |
| Tetramethylammonium hydroxide (1 cm³ 25% in water) | 21 | 4 | 10,5 | 5,1 | 35,2 | 47,3 | 1,8 |
| Benzyltrimethyl amm. hydr. (0,5 cm³ 40% in methanol) | 110 | 8 | 10,5 | 4,3 | 38,1 | 45,1 | 2,0 |
| Tetraheptylamm. hydr. (10 cm³ 100 mol m⁻³ in methanol) | 18 | 4 | 10,4 | 4,6 | 34,0 | 49,0 | 1,9 |
| Choline (1 cm³ 45% in methanol) | 280 | 7 | 10,3 | 4,6 | 34,0 | 49,0 | 2,0 |
| Tricaprylmethyl amm. hydr. (10 cm³ 100 mol m⁻³ in methanol) | 55 | 6 | 10,3 | 4,7 | 34,5 | 48,2 | 2,0 |
| Ammonium hydroxide (1 cm³ 25% NH₃ in water) | 38 | 6 | 10,3 | 4,7 | 36,2 | 46,6 | 2,1 |

EXAMPLE IV

Example I was repeated, using a 100 mol m⁻³ tetrabutylammonium hydroxide solution in methanol/isopropanol as additive and 100 mg Pd powder as catalyst. Hydrogenations were performed in the solvents acetone and hexane. The results are stated in Table 4.

TABLE 4

| Amount of additive solution (cm³) | Solvent | Hydrogenation time (min) | Trans (%) | Fatty acid composition (%) | | | | |
|---|---|---|---|---|---|---|---|---|
| | | | | C16:0 | C18:0 | C18:1 | C18:2 | C18:3 |
| | | starting oil | <1 | 10,9 | 3,6 | 21,0 | 56,2 | 8,0 |
| 10 | acetone | 33 | 7 | 10,7 | 3,6 | 32,4 | 50,8 | 2,0 |
| 5 | hexane | 40 | 5 | 10,9 | 3,8 | 36,3 | 47,0 | 2,0 |

EXAMPLE V

Example I was repeated, using some other solvents (see Table 5). As the additive solution 20% TEAH in H₂O was used. Two soyabean oils were hydrogenated. The hydrogenations were performed under the following conditions: 25 gram soyabean oil, 70 cm³ solvent, room temperature, atmospheric pressure, catalyst: 60 mg 3% Pd/C.

TABLE 5

| Solvent | Amount of additive solution (cm³) | Hydrogenation time (min) | Trans (%) | Fatty acid composition (%) | | | | |
|---|---|---|---|---|---|---|---|---|
| | | | | C16:0 | C18:0 | C18:1 | C18:2 | C18:3 |
| | | starting oil | <1 | 10,3 | 4,5 | 24,5 | 53,1 | 7,5 |
| dimethylformamide | 1 | 165 | 5 | 10,2 | 4,7 | 32,0 | 50,0 | 2,0 |
| methylisobutyl ketone | 0,1 | 250 | 6 | 10,1 | 4,6 | 33,6 | 49,8 | 1,8 |
| | | starting oil | <1 | 10.8 | 3,7 | 23,4 | 54,7 | 7,2 |
| ethyl acetate | 0,2 | 95 | 5 | 10,7 | 3,7 | 32,5 | 51,0 | 2,0 |
| tertiary butanol* | 0,5 | 43 | 7 | 10.8 | 3,8 | 35,0 | 48,2 | 2,0 |

*The hydrogenation with tertiary butanol was performed at a temperature of 40° C. the other hydrogenations at room temperature.

EXAMPLE VI

Example I was repeated. The reactor was loaded with 80 cm³ acetone, 5 cm³ methanol and 120 mg 3% Pd/C catalyst. According to the procedure described in Example I 1 cm³ 1 kmol m⁻³ CH₃ONa in methanol and 23,4 gram soyabean oil were added. Table 6 shows the results.

TABLE 6

| Hydrogenation time (min.) | Fatty acid composition | | | | | Trans (%) |
|---|---|---|---|---|---|---|
| | C16:0 | C18:0 | C18:1 | C18:2 | C18:3 | |
| Starting oil | 10,3 | 4,5 | 24,5 | 53,1 | 7,5 | <1 |
| 30 | 10,2 | 4,6 | 34,5 | 48,5 | 2,0 | 6 |

EXAMPLE VII

Example I was repeated. The influence of the additive TEAH on the hydrogenation behaviour of soyabean oil using as the catalyst 5% Pd/CaCO₃ was examined. Table 7 shows the results.

TABLE 7

| Amount of catalyst (mg) | 20% TEAH in H₂O (cm³) | Hydrogenation time (min.) | trans (%) | Fatty acid composition (%) | | | | |
|---|---|---|---|---|---|---|---|---|
| | | | | C16:0 | C18:0 | C18:1 | C18:2 | C18:3 |
| | | starting oil | <1 | 10,3 | 4,5 | 24,5 | 53,1 | 7,5 |
| 200 | 0 | 21 | 9 | 10,3 | 5,9 | 45,3 | 36,2 | 2,3 |
| 100 | 1 | 175 | 5 | 10,3 | 4,7 | 33,5 | 49,0 | 2,0 |

EXAMPLE VIII

To 120 mg of 3% Pd/C were added: 20 cm³ methanol and 1 cm³ 20% tetraethylammonium hydroxide in water. The mixture was stirred under an argon atmosphere and the palladium catalyst was filtered off still under the argon atmosphere. The reactor of Example I was loaded with 80 cm³ acetone, 60 mg pretreated 3% Pd/C catalyst and 24,1 gram soyabean oil. The reactor was repeatedly evacuated and purged with hydrogen.

The hydrogenation was carried out at room temperature and under atmospheric pressure.

Table 8 shows that soyabean oil can be hydrogenated selectively and with low cis-trans isomerisation using this pretreated catalyst.

TABLE 8

| Hydrogenation time (min.) | Fatty acid composition | | | | | Trans (%) |
|---|---|---|---|---|---|---|
| | C16:0 | C18:0 | C18:1 | C18:2 | C18:3 | |
| starting oil | 10,3 | 4,5 | 24,5 | 53,1 | 7,5 | <1 |
| 58 | 10,3 | 4,6 | 32,0 | 51,0 | 2,0 | 4 |

The various operations involving small scale pretreatments and small scale hydrogenations are preferably performed under an argon atmosphere with exclusion of air.

EXAMPLE IX

A nickel-silver catalyst, containing 23,8% Ni and 2,4% Ag on a carrier was tested in the soyabean oil hydrogenation. The catalyst was reduced with hydrogen at 450° C. for 3 hours. Hydrogenations were performed according to the procedure described in Example I with 1 gram reduced catalyst. The influence of the basic additive TEAH is shown in Table 9.

TABLE 9

| Additive | Hydrogenation time (min.) | Trans (%) | Fatty acid composition (%) | | | | |
|---|---|---|---|---|---|---|---|
| | | | C16:0 | C18:0 | C18:1 | C18:2 | C18:3 |
| | starting oil | <1 | 10,3 | 4,5 | 24,5 | 53,1 | 7,5 |
| none | 60 | 8 | 10,7 | 4,5 | 39,3 | 43,3 | 2,0 |
| 0,5 cm³ 20% TEAH in H₂O | 220 | 7 | 10,7 | 4,5 | 33,5 | 49,0 | 2,3 |

EXAMPLE X 1,24 gram Nickelacetate tetrahydrate was dissolved in 50 cm³ water. While stirring, 10 cm³ of an aqueous solution containing 1 kmol m$^{-3}$ sodium borohydrate and 100 mol m$^{-3}$ sodium hydroxide was added. When gas evolution ceased, a further 5 cm³ solution was added. The catalyst obtained was removed by centrifugation, then washed twice with 50 cm³ water and once with 50 cm³ ethanol and 50 cm³ acetone. All operations were carried out under an argon atmosphere.

The hydrogenation reactor from Example I was filled with 50 cm³ acetone and thereafter evacuated and purged three times with argon. The catalyst was transferred to the reactor with 20 cm³ acetone. Subsequently the basic additive 20% TEAH solution in water was added, the argon was replaced by hydrogen and the mixture was stirred for 15 minutes. After that 25 gram de-aerated soyabean oil was added and the hydrogenation was started. The same procedure was followed for the hydrogenation without basic additive.

TABLE 10

| Amount of TEAH in H₂O added (cm³) | Hydrogenation time (min.) | Trans (%) | Fatty acid composition % | | | | |
|---|---|---|---|---|---|---|---|
| | | | C16:0 | C18:0 | C18:1 | C18:2 | C18:3 |
| | starting oil | <1 | 10,3 | 4,5 | 24,5 | 53,1 | 7,5 |
| 0 | 70 | 5 | 10,2 | 7,2 | 39,0 | 41,0 | 2,0 |
| 0,15 | 195 | 7 | 10,1 | 5,4 | 37,5 | 45,0 | 2,0 |

EXAMPLE XI

The reactor from Example I was loaded with 70 cm³ isopropanol. The reactor was repeatedly evacuated and purged with argon. Subsequently 1,2 gram nickel acetate tetrahydrate, 0,9 gram tetramethylammonium borohydride and 0,3 cm³ of a 20% TEAH solution in H₂O were added. Then the argon was replaced by hydrogen and the mixture stirred for 15 minutes. 25 gram de-aerated soyabean oil was added and the hydrogenation started. Table 11 shows the results.

TABLE 11

| Hydrogenation time (min.) | Trans (%) | Fatty acid composition (%) | | | | |
|---|---|---|---|---|---|---|
| | | C16:0 | C18:0 | C18:1 | C18:2 | C18:3 |
| Starting oil | <1 | 10,3 | 4,5 | 24,5 | 53,1 | 7,5 |
| 30 | 7 | 10,8 | 4,7 | 35,9 | 46,6 | 1,9 |

EXAMPLE XII 1,2 gram Nickel acetate tetrahydrate and 60 cm³ dimethylformamide were introduced into the reactor from Example I. The solution was stirred, evacuated and purged with argon. With stirring, 12,5 cm³ of a 1 kmol m$^{-3}$ sodium borohydride solution in dimethylformamide was added, after 5 minutes followed by 1 cm³ of a 20% TEAH solution in H₂O. Argon was replaced by hydrogen and after 15 minutes 25 gram de-aerated soyabean oil was added and the hydrogenation started. Table 12 shows the results.

TABLE 12

| Hydrogenation time (min.) | Trans (%) | Fatty acid composition (%) | | | | |
|---|---|---|---|---|---|---|
| | | C16:0 | C18:0 | C18:1 | C18:2 | C18:3 |
| Starting oil | <1 | 10,3 | 4,5 | 24,5 | 53,1 | 7,5 |
| 36 | 8 | 11,0 | 4,5 | 36,5 | 46,2 | 2,0 |

EXAMPLE XIII 2 mmol Nickelacetylacetonate was dissolved in 60 cm³ dry toluene in the reactor from Example I under an argon atmosphere. Then 10 cm³ of a 1 kmol m$^{-3}$ triethylaluminium solution in dry toluene was added. After 5 minutes stirring, 0,5 cm³ of a 20% TEAH solution in water was added. Argon was replaced by hydrogen and the mixture stirred for 15 minutes. Then 25 gram soyabean oil was added and the hydrogenation was started. The same procedure was followed in the experiment without the additive TEAH. Table 13 shows the results.

TABLE 13

| Additive | Hydrogenation time (min.) | Trans (%) | Fatty acid composition (%) | | | | |
|---|---|---|---|---|---|---|---|
| | | | C16:0 | C18:0 | C18:1 | C18:2 | C18:3 |
| | starting oil | <1 | 10,8 | 3,7 | 23,4 | 54,7 | 7,2 |
| none | 5 | 11 | 10,7 | 5,5 | 41,5 | 40,0 | 2,0 |
| 0,5 cm³ 20% TEAH | | | | | | | |

TABLE 13-continued

| Additive | Hydrogenation time (min.) | Trans (%) | Fatty acid composition (%) | | | | |
|---|---|---|---|---|---|---|---|
| | | | C16:0 | C18:0 | C18:1 | C18:2 | C18:3 |
| in H$_2$O | 5 | 6 | 10,7 | 4,2 | 37,0 | 45,5 | 2,0 |

EXAMPLE XIV

Example XIII was repeated using some other solvents in the hydrogenation reaction and another molar ratio of the nickel and aluminium compound. The catalyst was prepared under argon in a small vessel, which was subsequently filled with 20 cm$^3$ toluene containing 3 mmol nickelacetylacetonate and 5 mmol triethylaluminium.

After the preparation the catalyst was transferred under argon into the reactor from Example I filled with 50 cm$^3$ of the other solvent as mentioned in Table 14. After 5 minutes stirring, 0,5 cm$^3$ of a 20% TEAH solution in water was added. Argon was replaced by hydrogen and the mixture stirred for 15 minutes. Then 25 gram soyabean oil was added and the hydrogenation was started. Table 14 summarizes the results.

TABLE 14

| Solvent mixture | Hydrogenation time (min.) | Trans (%) | Fatty acid composition (%) | | | | |
|---|---|---|---|---|---|---|---|
| | | | C16:0 | C18:0 | C18:1 | C18:2 | C18:3 |
| | starting oil | <1 | 10,8 | 3,7 | 23,4 | 54,7 | 7,2 |
| 50 cm$^3$ acetone 20 cm$^3$ toluene | 90 | 7 | 10,7 | 3,8 | 34,3 | 48,7 | 2,5 |
| 50 cm$^3$ ethylacetate 20 cm$^3$ toluene | 30 | 8 | 11,0 | 3,8 | 36,8 | 45,3 | 2,0 |

EXAMPLE XV

In this Example an apparatus consisting of a double-walled vessel with a net content of 600 cm$^3$, through the mantle of which thermostated water can flow, was used. The vessel was provided with four baffles and a stirrer.

The vessel was provided with inlets for substrate and hydrogen and a sampling device.

In this apparatus soyabean oil was hydrogenated at 24° C. and under atmospheric pressure. The apparatus was loaded with 450 cm$^3$ acetone and 100 cm$^3$ soyabean oil.

4,5 cm$^3$ of a 20% tetraethylammonium hydroxide solution in water was added. The contents of the reactor were stirred for a few minutes and the catalyst was added. The catalyst load amounted to 100 mg Pd/kg oil of a 3% palladium-on-carbon catalyst.

Then the reactor was repeatedly evacuated and purged with hydrogen. Hydrogen was purified over a BTS-column and dried over a molecular sieve column. The course of the reaction was followed by hydrogen uptake reading from calibrated and thermostated (t=27° C.) burettes filled with purified hydrogen and paraffin oil. After hydrogenation with catalyst was filtered off and the solvent evaporated. The hydrogenated product was analyzed for fatty acid composition and trans isomer content. Table 15 summarizes the results.

TABLE 15

| Hydrogenation time (min,) | Trans (%) | Fatty acid composition (%) | | | | |
|---|---|---|---|---|---|---|
| | | C16:0 | C18:0 | C18:1 | C18:2 | C18:3 |
| Starting oil | <1 | 10,5 | 3,9 | 21,5 | 53,9 | 8,5 |
| 22 | 5 | 10,5 | 3,9 | 33,0 | 49,1 | 2,0 |

EXAMPLE XVI

Example XV was repeated, using some other quanternary ammonium compounds as additive. The hydrogenation reactor was filled with 100 cm$^3$ soyabean oil and 450 cm$^3$ acetone. A 30 cm$^3$ solution of an additive as mentioned in Table 16 was mixed with the contents of the reactor. Then the catalyst, 3% Pd-on-carbon, was added. Table 16 represents the results.

TABLE 16

| Additive solution (added 30 cm$^3$) | Catalyst load (mg Pd/kg oil) | Hydrogenation time (min.) | Trans content (%) | Fatty acid composition (%) | | | | |
|---|---|---|---|---|---|---|---|---|
| | | | | C16:0 | C18:0 | C18:1 | C18:2 | C18:3 |
| | | starting oil | <1 | 10,5 | 3,9 | 21,5 | 53,9 | 8,5 |
| 50 mol m$^{-3}$ tetraethylammonium phosphate in acetone (containing 2% water) | 400 | 99 | 9 | 10,4 | 4,1 | 36,9 | 45,0 | 2,0 |
| 200 mol m$^{-3}$ tetraethylammonium hydroxide in acetone (containing 12% water) | 100 | 22 | 5 | 10,5 | 3,9 | 33,0 | 49,1 | 2,0 |
| 50 mol m$^{-3}$ tetraethylammonium acetate in acetone (containing 3% water) | 50 | 75 | 5 | 10,6 | 4,0 | 33,7 | 48,2 | 2,0 |

EXAMPLE XVII

In the following four experiments the catalyst 3% Pd/C was pretreated with a TEAH solution. In experiments A, B and C the pretreated catalyst was added to the hydrogenation reactor of Example XV, filled with soyabean oil and acetone. In experiment D hexane was the solvent and the catalyst and the additive were added directly to the hydrogenation reactor. The hydrogenations were performed as mentioned in Example XV.

In experiment A catalyst, 0,50 cm³ 20% TEAH in H₂O and 40 cm³ acetone were mixed in a beaker. After that the mixture was added to the hydrogenation reactor.

In experiment B catalyst, 1,25 cm³ 20% TEAH in H₂O and 40 cm³ acetone were mixed in a beaker. The catalyst was removed by centrifugation and rinsed into the reactor with fresh acetone. In experiment C the catalyst was wetted with a 20% TEAH solution in water. The treated catalyst was stored under vacuum for three weeks.

In experiment D catalyst, 0.6 cm³ of a 25% solution of TEAH in methanol, 250 cm³ soyabean oil and 250 cm³ hexane were mixed in the hydrogenated reactor, then the hydrogenation was started.

The results of the experiments are shown in Table 17.

EXAMPLE XVIII

Some experiments of Example XVII were repeated in a 10 dm³ autoclave at atmospheric pressure and temperatures between 20° and 25° C. The catalyst treatment conditions were:

Experiment E: Catalyst, 10 cm³ 20% TEAH in H₂O, acetone and soyabean oil were mixed under nitrogen in the autoclave.

Experiment F: Catayst, 25 cm³ 20% TEAH in H₂O and some acetone were mixed in a beaker. The catalyst was removed by centrifugation, and rinsed with fresh acetone into the autoclave filled with soyabean oil and acetone.

Experiment G: The autoclave was filled with 4 dm³ soyabean oil and 4 dm³ hexane. Catalyst and 16 cm³ 25% TEAH in methanol were added.

The contents were stirred and the hydrogenation was started.

The results of the various hydrogenations are summarized in Table 18.

TABLE 18

| Experiment No. | Catalyst (loading Pd/kg oil) | Soyabean oil (cm³) | Solvent (dm³) | Hydro-genation time (min) | H₂-uptake (dm³) | Trans-content (%) | Fatty acid composition (%) | | | | |
|---|---|---|---|---|---|---|---|---|---|---|---|
| | | | | | | | C16:0 | C18:0 | C18:1 | C18:2 | C18:3 |
| | | | | starting oil | | <1 | 10,6 | 4,0 | 23,0 | 53,3 | 7,7 |
| E | 3% Pd/C (50) | Acetone (4) | 141 | 48 | 6 | 10,6 | 4,0 | 32,2 | 49,6 | 2,1 | |
| F | 3% Pd/C (75) | 4 | Acetone (4) | 150 | 51 | 8 | 10,7 | 4,0 | 32,8 | 49,6 | 1,6 |
| G | 3% Pd/C (50) | 4 | Hexane (4) | 110 | 54 | 5 | 10,6 | 4,0 | 34,7 | 47,0 | 2,3 |

The results agree with the experiments on a 500 gram scale.

EXAMPLE XIX

The catalyst was mixed with 2,5 cm³ 20% TEAH in H₂O and 70 cm³ acetone in a beaker. The catalyst was removed by centrifugation and added to the hydrogenation reactor filled with 500 cm³ soyabean oil.

The first hydrogenation was performed in the glass reactor of Example XV, at atmospheric pressure and 60° C.

The same procedure was followed for the second experiment in a 10 dm³ autoclave. The hydrogenation was carried out at atmospheric pressure and 60° C.

Table 19 shows the results of the two hydrogenations.

TABLE 19

| Experiment performed in: | catalyst (load mg Pd/kg oil) | Soyabean oil (dm³) | Hydrogenation time (min.) | Trans (%) | Fatty acid composition (%) | | | | |
|---|---|---|---|---|---|---|---|---|---|
| | | | | | C16:0 | C18:0 | C18:1 | C18:2 | C18:3 |
| | | | starting oil | <1 | 10,6 | 4,0 | 23,0 | 53,3 | 7,7 |
| glass reactor | 3% Pd/C (50) | 0,5 | 69 | 12 | 10,6 | 4,0 | 32,3 | 49,6 | 2,0 |
| autoclave | 3% Pd/C (50) | 8 | 170 | 14 | 10,6 | 4,0 | 32,7 | 49,6 | 2,7 |

TABLE 17

| Experiment No. | Catalysts (load: mgPd/kg oil) | Soyabean oil (cm³) | Solvent (cm³) | Hydro-genation time(min.) | Trans-content (%) | Fatty acid composition (mol %) | | | | |
|---|---|---|---|---|---|---|---|---|---|---|
| | | | | | | C16:0 | C18:0 | C18:1 | C18:2 | C18:3 |
| | | | | starting oil | <1 | 10,6 | 4,0 | 23,0 | 53,3 | 7,7 |
| A | 3% Pd/C (40) | 250 | Acetone (250) | 190 | 4 | 10,6 | 4,0 | 33,0 | 48,6 | 2,0 |
| B | 3% Pd/C (50) | 250 | Acetone (250) | 157 | 5 | 10,6 | 4,0 | 33,9 | 48,0 | 2,0 |
| C | 3% Pd/C (250) | 100 | Acetone (450) | 137 | 6 | 10,5 | 4,0 | 33,2 | 48,3 | 2,0 |
| D | 3% Pd/C (60) | 250 | Hexane (250) | 75 | 5 | 10,6 | 4,1 | 35,7 | 46,2 | 2,0 |

EXAMPLE XX

In a small reactor (net volume 50 cm³) the catalyst was pretreated and after that transferred to the hydrogenation reactor. 3% Pd/C (load 25 mg Pd/kg oil), 0,14 cm³ 20% TEAH in H₂O and 25 cm³ acetone were stirred for half an hour under H₂ or N₂. After that the contents were transferred to the hydrogenation reactor (glass reactor of Example XV) filled with 100 cm³ soyabean oil and 450 cm³ acetone. The hydrogenations were performed at 24° C. and atmospheric pressure.

The results are given in Table 20.

TABLE 20

| Atmosphere under which pretreatment was performed | Hydrogenation time (min.) | Trans (%) | Fatty acid composition (%) | | | | |
|---|---|---|---|---|---|---|---|
| | | | C16:0 | C18:0 | C18:1 | C18:2 | C18:3 |
| starting oil | | <1 | 10,5 | 3,9 | 21,5 | 53,9 | 8,5 |
| N₂ | 270 | 5 | 10,4 | 4,0 | 35,4 | 46,6 | 2,0 |
| H₂ | 106 | 5 | 10,4 | 4,0 | 34,2 | 47,3 | 2,0 |

The pretreatment under H₂ results in a shorter hydrogenation time which is especially pronounced at lower catalyst loads and lower temperatures.

EXAMPLE XXI

Example XX was repated, using 3% Pd-on-carbon and also 5% Pt-on-carbon and 5% Rh-on-carbon as catalysts. Some water was added to the mixture in the small reactor to enhance the solubility of TEAH.

Pretreatment conditions:

A small reactor was filled with 720 mg 5% Pt/C or 720 mg 5% Rh/C, 2,03 cm³ 20% TEAH in H₂O, 22 ml acetone and 6 ml H₂O. Stirring was effected for half an hour under H₂. In case of 3% Pd/C, the small reactor was filled with 300 mg 3% Pd/C, 0,54 cm³ 20% TEAH in H₂O, 22 cm³ acetone and 6 cm³ H₂O.

The contents of the small reactor were transferred to the glass reactor from Example XV filled with 100 cm³ soyabean oil and 450 cm³ acetone. Hydrogenations were performed at 24° C. and under atmospheric pressure. Table 21A shows the results.

TABLE 21A

| Catalyst load | Trans (%) | Fatty acid composition (%) | | | | |
|---|---|---|---|---|---|---|
| | | C16:0 | C18:0 | C18:1 | C18:2 | C18:3 |
| Starting oil | <1 | 10,5 | 3,9 | 21,5 | 53,9 | 8,5 |
| 5% Pt/C (400 mg Pt/kg oil) | <1 | 10,4 | 5,9 | 36,3 | 44,1 | 2,0 |
| 5% Rh/C (400 mg Rh/kg oil) | 8 | 10,5 | 4,8 | 39,7 | 41,9 | 2,0 |
| 3% Pd/C (100 mg Pd/kg oil) | 4 | 10,4 | 3,9 | 33,0 | 48,9 | 2,0 |

By adding TEAH, selectivities I and II are improved and less trans isomers are formed. For comparison hydrogenation results without additive are presented in Table 21B. In these cases, the catalysts were not pretreated with hydrogen. In the glass reactor soyabean oil, acetone and catalyst were mixed and then the hydrogenation was started.

TABLE 21B

| Catalyst load | Trans (%) | Fatty acid composition (%) | | | | |
|---|---|---|---|---|---|---|
| | | C16:0 | C18:0 | C18:1 | C18:2 | C18:3 |
| Starting oil | <1 | 10,8 | 3,6 | 20,7 | 55,6 | 7,5 |
| 5% Pt/C (100 mg Pt/kg oil) | 4 | 10,8 | 17,7 | 39,4 | 28,1 | 2,0 |
| 5% Rh/C (200 mg Rh/kg oil) | 18 | 10,8 | 14,1 | 38,4 | 32,5 | 2,0 |
| 5% Pd/C (50 mg Pd/kg oil) | 16 | 10,8 | 5,1 | 45,3 | 34,4 | 2,0 |

EXAMPLE XXII

The influence of TEAH on the hydrogenation of soyabean oil with Raney nickel was examined. In a small reactor, Raney nickel, 2,2 cm³ 20% TEAH in H₂O, 24 cm³ acetone and 6 cm³ H₂O were stirred for half an hour under hydrogen. After that the contents were introduced into the glass hydrogenation reactor from Example XV filled with 100 cm³ soyabean oil and 450 cm³ acetone. The hydrogenation was performed at 24° C. and under atmospheric pressure.

For comparison, a hydrogenation was carried out without additive. In the small reactor, Raney Ni, 24 cm³ acetone and 6 cm³ H₂O were stirred for half an hour under hydrogen and after that transferred to the hydrogenation reactor from Example XV. Table 22 summarizes the results.

TABLE 22

| Additives | Catalyst (load) | Hydrog. time (min.) | Trans (%) | Fatty acid comp. (%) | | | | |
|---|---|---|---|---|---|---|---|---|
| | | | | C16:0 | C18:0 | C18:1 | C18:2 | C18:3 |
| | | starting oil | <1 | 10,5 | 3,9 | 21,5 | 53,9 | 8,5 |
| Without additive | Raney Ni (0,5%) | 112 | 9 | 10,4 | 5,4 | 37,3 | 42,3 | 3,4 |
| 20% TEAH in H₂O | Raney Ni (1%) | 296 | 5 | 10,4 | 4,3 | 30,1 | 50,5 | 3,4 |

It was observed that in the presence of the additive some acetone was hydrogenated.

EXAMPLE XXIII

The hydrogenations were carried out at 40° C. and under atmospheric pressure.

TABLE 24

| Catalyst (load mg of metal per kg oil) | amount of 20% TEAH added to the small reactor (cm³) | Hydrog. time (min.) Starting oil | Trans (%) <1 | Fatty acid comp. (%) | | | | |
|---|---|---|---|---|---|---|---|---|
| | | | | C16:0 42,0 | C18:0 4,8 | C18:1 38,6 | C18:2 '10,2 | C18:3 0,2 |
| 3% Pd/C (10) | 0 | 150 | 7 | 42,3 | 6,7 | 45,1 | 2,0 | 0,0 |
| 3% Pd/C (50) | 0,2 | 70 | 4 | 42,8 | 5,2 | 46,9 | 2,0 | 0,0 |
| 5% Pt/C (50) | 0 | 100 | 4 | 42,0 | 14,8 | 37,5 | 2,0 | 0,0 |
| 5% Pt/C (100) | 0,68 | 268 | <1 | 42,4 | 6,4 | 45,1 | 2,0 | 0,0 |

Linseed oil was hydrogenated with 3% Pd/C in the presence of the additive TEAH.

In the small reactor, 3% Pd/C (load: 100 mg Pd/kg oil), 0,92 cm³ 20% TEAH in H₂O, 22 cm³ H₂O were stirred for half an hour under hydrogen. Then the contents were introduced into the glass hydrogenation reactor from Example XV filled with 100 cm³ linseed oil and 450 cm³ acetone. The hydrogenation was carried out at 24° C. and under atmospheric pressure. The results are listed in Table 23.

TABLE 23

| Hydrogenation time (min.) starting linseed oil | H₂-uptake (cm³) | Trans (%) <1 | Fatty acid comp. (%) | | | | |
|---|---|---|---|---|---|---|---|
| | | | C16:0 6,1 | C18:0 3,5 | C18:0 17,9 | C18:2 19,2 | C18:3 52,7 |
| 65 | 2000 | 10 | 6,2 | 3,8 | 24,2 | 36,1 | 29,3 |
| 243 | 4400 | 20 | 6,2 | 4,0 | 33,5 | 49,1* | 6,9 |
| 309 | 5150 | 23 | 6,1 | 4,1 | 39,7 | 46,7 | 2,0 |

*maximum amount of C18:2 in the oil during the hydrogenation.

In the hydrogenated sample several C18:2 isomers were observed.

EXAMPLE XXIV

Palm oil was hydrogenated with 3% Pd/C and 5% Pt/C catalysts and the effect of TEAH on the hydrogenation results was examined.

The catalysts were pretreated in the small reactor. The contents thereof: catalyst, 20% TEAH in H₂O, 20 cm³ acetone and 1 cm³ H₂O, were stirred for half an hour under hydrogen. The exact amounts of catalyst and TEAH-solution, used in the various experiments, are listed in columns 1 and 2 of Table 24.

After the pre-treatment the contents of the small reactor were introduced into the glass hydrogenation reactor from Example XV filled with palm oil and acetone.

EXAMPLE XXV

The solvents used in the additive solution influence the hydrogenation characteristics of soyabean oil as is shown in this Example. Two experiments were carried out:

Experiment A: 30 cm³ 100 mol m⁻³ NaOH in methanol (methanol contained 5% H₂O) was added to the oil/acetone mixture in the glass hydrogenation reactor from Example XV.

Experiment B: The contents of the small reactor consisted of catalyst, 0,67 cm³ 2,5 kmol m⁻³ NaOH in water, 24 cm³ acetone and 6 cm³ H₂O.

Hydrogenation conditions: 100 cm³ soyabean oil, 450 cm³ acetone, temperature: 24° C., atmospheric pressure. Table 25 shows the results.

TABLE 25

| Experiment | Catalyst (load:mg Pd/kg oil) | Hydrog. time (min.) starting oil | Trans (%) <1 | Fatty acid composition (%) | | | | |
|---|---|---|---|---|---|---|---|---|
| | | | | C16:0 10,5 | C18:0 3,9 | C18:1 21,5 | C18:2 53,9 | C18:3 8,5 |
| A | 5% Pd/C (200) | 260 | 11 | 10,5 | 4,4 | 36,5 | 44,4 | 2,0 |
| B | 3% Pd/C (200) | 94 | 6 | 10,5 | 4,0 | 31,8 | 49,7 | 2,0 |

EXAMPLE XXVI

Hydrogenations were performed in the presence of hydroxides of some elements of groups I and II of the periodic system and ammonium hydroxide. In the small reactor 3% Pd/C (load: 200 mg Pd/kg oil) and additive solution (as listed in column 1 of Table 26) were stirred under hydrogen for half an hour. After that the contents were introduced into the glass reactor from Example XV filled with 100 cm³ soyabean oil and 450 cm³ acetone. The hydrogenations were performed at 24° C. and under atmospheric pressure. See Table 26 for the results.

TABLE 26

| Additive solution | Hydrog. time (min.) starting oil | Trans (%) <1 | Fatty acid composition (%) | | | | |
|---|---|---|---|---|---|---|---|
| | | | C16:0 10,5 | C18:0 3,9 | C18:1 21,5 | C18:2 53,9 | C18:3 8,5 |
| 1,7 mmol LiOH in 16,7 cm³ H hd 2O + 15 cm³ acetone | 41 | 4 | 10,4 | 4,0 | 32,5 | 49,8 | 2,0 |
| 1,7 mmol NaOH in 6,7 cm³ H₂O + 24 cm³ acetone | 94 | 6 | 10,5 | 4,0 | 31,8 | 49,7 | 2,0 |
| 1,7 mmol KOH in 6,7 cm³ H₂O + 24 cm³ acetone | 139 | 6 | 10,5 | 4,0 | 31,2 | 50,6 | 2,0 |
| 1,7 mmol RbOH in 6,7 cm³ H₂O + 24 cm³ acetone | 222 | 6 | 10,4 | 4,0 | 31,0 | 51,0 | 2,0 |
| 1,7 mmol CsOH in 6,7 cm³ H₂O + 24 cm³ acetone | 489 | 6 | 10,5 | 4,1 | 29,8 | 51,9 | 2,0 |
| 0,84 mmol Ba(OH)₂ in 26,7 cm³ H₂O | 44 | 6 | 10,4 | 4,3 | 35,1 | 46,7 | 2,0 |
| 7,1 mmol . NH₄OH in 7,1 cm³ H₂O + 20 cm³ acetone | 13 | 5 | 10,5 | 4,1 | 35,1 | 46,8 | 2,0 |

EXAMPLE XXVII

The effect of TEAH on the hydrogenation characteristics of rapeseed oil was studied.

In the small reactor 3% Pd/C (load: 100 mg Pd/kg oil), 0,62 cm³ 20% TEAH in H₂O, 25 cm³ acetone and 6 cm³ H₂O were stirred for half an hour under H₂. Then the contents were introduced into the glass reactor from Example XV filled with 100 cm³ rapeseed oil and 450 cm³ acetone. The hydrogenation was performed at 24° C. and under atmospheric pressure.

The same procedure was followed to the hydrogenation without the additive TEAH. Table 27 shows the results.

TABLE 27

| Additive (TEAH) | Hydrogenation time (min.) Starting oil | Trans (%) <1 | Fatty acid composition (%) | | | | |
|---|---|---|---|---|---|---|---|
| | | | C16:0 4,3 | C18:0 2,0 | C18:1 59,1 | C18:2 19,2 | C18:3 9,5 |
| without | 20 | 6 | 4,3 | 3,9 | 68,4 | 14,8 | 2,0 |
| with | 138 | 3 | 4,3 | 2,3 | 64,6 | 20,4 | 2,0 |

EXAMPLE XXVIII

The influence of the added amount of TEAH on the hydrogenation behaviour of soyabean oil was examined.

In the small reactor, 3% Pd/C (load: 50 mg Pd/kg oil), 25 cm³ acetone, 1 cm³ H₂O and different amounts of 20% TEAH in H₂O (see column 1 of Table 28) were stirred for half an hour under hydrogen. After that the contents were introduced into the glass hydrogenation reactor of Example XV filled with 250 cm³ soyabean oil and 250 cm³ acetone.

The hydrogenations were carried out at 25° C. and under atmospheric pressure.

TABLE 28

| Amount of 20% TEAH in small small reactor (cm³) | Hydrogenation time starting oil | Trans (%) <1 | Fatty acid composition (%) | | | | |
|---|---|---|---|---|---|---|---|
| | | | C16:0 10,6 | C18:0 4,0 | C18:1 23,1 | C18:2 53,3 | C18:3 7,5 |
| 0 | 53 | 13 | 10,6 | 5,2 | 45,3 | 36,0 | 2,0 |
| 0,04 | 53 | 9 | 10,5 | 4,6 | 41,2 | 40,2 | 2,0 |
| 0,08 | 77 | 8 | 10,6 | 4,2 | 37,6 | 44,4 | 2,0 |
| 0,155 | 93 | 6 | 10,6 | 4,1 | 35,0 | 46,6 | 2,0 |
| 0,31 | 140 | 4 | 10,6 | 4,0 | 32,7 | 49,2 | 2,0 |
| 0,62 | 205 | 4 | 10,6 | 4,0 | 31,9 | 50,0 | 2,0 |

EXAMPLE XXIX

The influence of temperature and pressure on the hydrogenation behaviour of soyabean oil was examined.

In the small reactor, 3% Pd/C (load: 50 mg Pd/kg oil), 0,31 cm³ 20% TEAH in H₂O, 25 cm³ acetone and 1 cm³ H₂O were stirred for half an hour under hydrogen.

Three hydrogenations were performed in a 1 dm³ Parr autoclave and one in the glass reactor of Example XV, filled with 250 cm³ soyabean oil and 250 cm³ acetone, under the conditions mentioned in Table 29.

The contents of the small reactor were introduced into the hydrogenation reactor, filled with oil and acetone, under nitrogen. After reaching the desired hydrogenation temperature, nitrogen was replaced by hydrogen. The results of the hydrogenations are presented in Table 29.

TABLE 29

| 3% Pd/C catalyst (load:mg. Pd/kg oil) | Temp. (°C.) | Pressure (kPa) | Hydrog. time (min.) starting oil | Trans (%) <1 | \multicolumn{5}{c|}{Fatty acid composition (%)} |
|---|---|---|---|---|---|---|---|---|---|
| | | | | | C16:0 10,6 | C18:0 4,0 | C18:1 23,1 | C18:2 53,3 | C18:3 7,5 |
| 50 | 15* | 101 | 250 | 3 | 10,6 | 4,0 | 32,0 | 49,6 | 2,0 |
| 50 | 25 | 350 | 127 | 4 | 10,6 | 4,1 | 31,7 | 49,9 | 2,0 |
| 50 | 65 | 450 | 15 | 7 | 10,6 | 4,0 | 32,5 | 49,5 | 2,0 |
| 50 | 100 | 550 | 12 | 11 | 10,6 | 4,0 | 32,4 | 49,3 | 2,0 |

*This experiment was performed in the glass reactor from Example XV.

I claim:

1. Process for the selective hydrogenation of triglyceride oils containing fatty acid residues having more than one double bond between carbon atoms comprising hydrogenating said oils in the presence of a catalytically active metal of group VIII of the periodic system of the elements, said catalytically active metal being optionally promoted by a metal from another group of said system, and in the presence of a basic compound with the formula AX, in which A is selected from the group consisting of $R_1R_2R_3R_4N^+$; $R_1, R_2, R_3$ and $R_4$ each being an alkyl, cycloalkyl, aryl or aralkyl group with 1 to 20 carbon atoms which may be substituted; the elements of group I or II of the periodic system, and ammonium, and X is selected from the group consisting of hydroxyl, an anion of a weak acid and RO—, in which R is an alkyl group.

2. Process according to claim 1, in which the catalyst is treated with the basic compound, before addition to the compound to be hydrogenated.

3. Process according to claim 1, in which the excess of basic compound is separated from the catalyst before the catalyst is added to the compound to be hydrogenated.

4. Process according to claim 1, in which the basic compound is directly added to the compound to be hydrogenated.

5. Process according to claim 1, in which the basic compound is added in an amount of 0,1 to 100 mol per $m^3$ of the compound to be hydrogenated.

6. Process according to claim 1, in which the basic compound is dissolved in water or an organic liquid or a mixture thereof.

7. Process according to claim 1, in which the basic compound is selected from the group consisting of hydroxides, carbonates, phosphates, formates, acetates and lactates of tetramethylammonium, tetraethylammonium, tetrabutylammonium, tetraheptylammonium, hexadecyltrimethylammonium, benzyltrimethylammonium, tricaprylmethylammonium, ethanoltrimethylammonium and a bis-tetraalkylammonium.

8. Process according to claim 1, in which the basic compound is selected from the group consisting of the hydroxides, carbonates, phosphates, formates, acetates, lactates and alcoholates of lithium, sodium, potassium, rubidium, cesium, barium and/or ammonium.

9. Process according to claim 1, in which the substance to be hydrogenated is dissolved in an organic liquid, preferably a ketone, hydrocarbon, alcohol or a mixture thereof.

10. Process according to claim 1, in which the hydrogenation takes place without addition of a solvent for the substance to be hydrogenated.

11. Process according to claim 1, in which the hydrogenation is carried out at a temperature of between −20° and 200° C., preferably 0° to 100° C., and at a pressure of between 100 and 2500 kPa.

12. Process according to claim 1, characterized in that the substance to be hydrogenated is an edible triglyceride oil.

* * * * *